United States Patent Office 2,781,338
Patented Feb. 12, 1957

2,781,338

DIAZOAMINO COMPOUNDS

Eduard Moser, Basel, Albert Bolleter, Muttenz, and Christian Wittwer, Basel, Switzerland, assignors to Ciba Limited, Basel, Switzerland, a Swiss firm No Drawing. Application August 20, 1954,
Serial No. 451,296

Claims priority, application Switzerland August 28, 1953

6 Claims. (Cl. 260—140)

This invention provides valuable new diazoamino-compounds which, like the compound of the constitution (1)
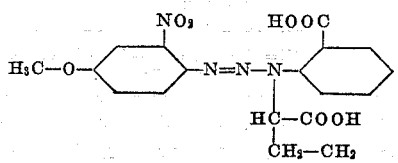

correspond to the general formula (2)
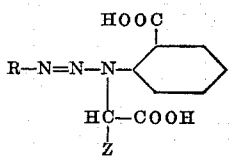

in which R represents the radical of a diazo component suitable for the production of ice colors, and Z represents a hydrocarbon radical, preferably a hydrocarbon radical containing at the most six carbon atoms.

The invention also includes a process for making these new diazoamino-compounds, wherein a dicarboxylic acid of the formula (3)
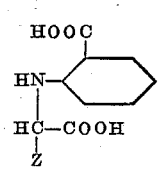

is condensed with a diazo-compound, which is suitable for the production of ice colors. There are advantageously used diazo-compounds of the benzene series, for example, those of amines of the formula (4)

in which R represents a benzene radical, X and H are each in ortho-position relatively to the amino group, and X represents a hydrogen atom, a chlorine atom, a nitro group or a methyl, methoxy or ethoxy group.

Especially valuable are diazoamino-compounds of the formula (5)
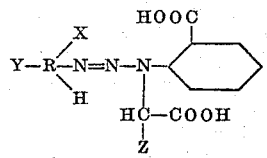

which are obtained by condensing a dicarboxylic acid of the formula

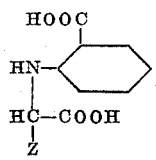

in which Z represents an ethyl or n-propyl group (V) or an isopropyl group (W) or a phenyl radical (W) or a methyl group, with a diazo-compound of an amine which is free from groups imparting solubility in water and corresponds to the formula (6)
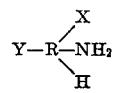

in which R represents a benzene radical, Y is in para-position and X and H are each in ortho-position relatively to the the amino group, X represents a methyl, methoxy or ethoxy group (U) or a hydrogen or chlorine atom or a nitro group, and Y represents a hydrogen atom or any desired substituent, and so choosing the starting materials that the $pK_A$-value of the amine differs by not more than $\pm 0.7$ from the value $$c = c_{X;Z} - c_Y$$

where $c_{(X=H; Z=CH_3)} = 3.4$, $c_{(X=U; Z=CH_3)} = 2.7$ $c_{(X=Cl; Z=CH_3)} = 2.3$, $c_{(X=NO_2; Z=CH_3)} = 1.0$ $c_{(X=H; Z=V)} = 3.2$, $c_{(X=U; Z=V)} = 2.2$ $c_{(X=Cl; Z=V)} = 2.0$, $c_{(X=NO_2; Z=V)} = 0.5$ $c_{(X=H; Z=W)} = 2.8$, $c_{(X=U; Z=W)} = 2.0$ $c_{(X=Cl=Z=W)} = 1.7$, $c_{(X=NO_2; Z=W)} = 0.1$ $c_{(Y=CN, SO_2 Alkyl, sulfonamide)} = 1.0$ and $c_{(Y=NO_2)} = 1.4$ and $c_Y = 0$ when Y represents a hydrogen atom or a substituent other than one of those specified above.

Thus, there may be used the following dicarboxylic acids:

α-(2-carboxyphenyl)-aminopropionic acid,
(Z=V) α-(2-carboxyphenyl)-aminobutyric acid,
α-(2-carboxyphenyl)-aminovaleric acid,
(Z=W) α-(2-carboxyphenyl)-amino-β-methyl-butric acid,
α-(2-carboxyphenyl)-amino-phenylacetic acid of the formula

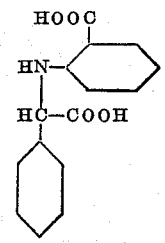

The amines of the Formula 6, of which the diazo-compounds are used as starting materials in the present process, are amines of the benzene series. They contain no substituent in one of the ortho-positions relatively to the diazotizable amino group and in the other ortho-position relatively to that amino group they may be unsubstituted or contain a chlorine atom, a nitro group or a substituent U, namely a methyl, methoxy or ethoxy group. Apart from these substituents the benzene nucleus may contain substituents in positions other than an ortho-position relatively to the amino group and which do not impart solubility in water, for example, halogen atoms such as chlorine, methyl or ethyl groups, methoxy or ethoxy groups, trifluoromethyl groups or nitro groups. Thus, the amines, for example, may be unsubstituted in para-position relatively to the amino group or may contain in that position, a chlorine atom, a methyl or methoxy group, an acylamino group, a cyano group, an alkyl or aryl sulfone group, a sulfonic acid amide group or a nitro group. There come into consideration, for example, the following amines:

1-amino-2:5-dichlorobenzene,
1-amino-2-chloro-5-trifluoromethylbenzene,
1-amino-2-methyl-4-nitrobenzene,
1-amino-2-methoxy-4-nitrobenzene,
1-amino-2-nitro-4-methoxybenzene,
1-aminobenzene-4-methyl-sulfone,
1-amino-2-chloro-4-cyano-5-methylbenzene.

For making the diazoamino-compounds of the Formula 5 the amine of the Formula 6 is so chosen that its $pK_A$-value is not more than 0.7 higher or lower than the value $c = c_{X;Z} - c_Y$. The value of $c_{X;Z}$ depends on the nature of the substituents in ortho-position relatively to the amino group of the amine (X=H, Cl, $NO_2$ or U) and on the nature of the substituents in the amino group of the dicarboxylic acid (Z=$CH_3$, V or W), and the value $c_Y$ depends on the nature of the substituent in para-position relatively to the amino group of the amine, and $c_Y$ is zero when this para-position is not occupied by an alkyl-sulfone group, a sulfonic acid amide group, a cyano group or a nitro group, and, when these substituents are present, the values of $c_Y$ being as specified above.

In order to determine whether a particular combination of starting materials corresponds to the above definition of the diazoamino-compounds of the Formula 5, the $pK_A$-value of the chosen amine must be known, and then it can easily be determined whether that value differs by more than 0.7 from the value $c = c_{X;Z} - c_Y$ for the particular substituents X, Y and Z present in the chosen combination. For example, the $pK_A$-value of 1-amino-2-methyl-4-nitrobenzene is 0.9, and in this case X is U (=—$CH_3$) and Y is —$NO_2$. The combination of this amine with α-(2-carboxyphenyl)-aminopropionic acid (Z=—$CH_3$) gives the value $$c = c_{X;Z} - c_Y = c_{(X=U;Z=CH_3)} - c_{(Y=NO_2)} = 2.7 - 1.4 = 1.3$$

This value differs from 0.9 by less than 0.7, and therefore the combination corresponds to the definition of the product according to Formula 5.

According to recent textbooks the $pK_A$-value of an amine R—$NH_2$ is determined from the equilibrium $$RNH_3^{\oplus} \rightleftarrows R-NH_2 + H^{\oplus}$$

of which the acidity constant is $$K_A = \frac{(R-NH_2).(H^{\oplus})}{(R-NH_3^{\oplus})}$$

the symbols of the components of the equilibrium given in curved brackets representing their activities. The $pK_A$-value is then defined by the relationship $$pK_A = -\log K_A$$

Fuller information with regard to the $pK_A$-value and its determination, which may be carried out by an acidimetric, conductometric or colorimetric method, can be obtained, for example, from "Physical Chemistry of Electrolytic Solutions" by H. S. Harned and B. B. Owen, Chapter 15/4, 1943 edition, pages 480 et seq.

In order to facilitate the determination of the permissible deviations of the $pK_A$-values of the amines from values $c$ of the diazoamino-compounds, which fulfill the requirements of the definition of the Formula 5, the following table may be used. From this table direct readings can be obtained of the limits within which the $pK_A$-value of an amine having given substituents X in ortho-position and Y in para-position relatively to the amino group, and a given nitrogen-substituent Z of the dicarboxylic acid of the Formula 3, must fall.

| X | Y | | Permissible pKA-range of the amine | | |
|---|---|---|---|---|---|
| | | | Z=$CH_3$ | Z=V —$C_2H_5$ n—$C_3H_7$ | Z=W=Iso—$C_3H_7$ $C_6H_5$ |
| H | A | (H or any desired substituent except B and C). | 2.7 to 4.1 | 2.5 to 3.9 | 2.1 to 3.5 |
| | B | (CN, $SO_2$-Alkyl or the sulfonic acid amide group). | 1.7 to 3.1 | 1.5 to 2.9 | 1.1 to 2.5 |
| | C | ($NO_2$) | 1.3 to 2.7 | 1.1 to 2.5 | 0.7 to 2.1 |
| $CH_3$ | A | | 2.0 to 3.4 | 1.5 to 2.9 | 1.3 to 2.7 |
| U=O—$CH_3$ | B | | 1.0 to 2.4 | 0.5 to 1.9 | 0.3 to 1.7 |
| O—$C_2H_5$ | C | | 0.6 to 2.0 | 0.1 to 1.5 | −0.1 to 1.3 |
| | A | | 1.6 to 3.0 | 1.3 to 2.7 | 1.0 to 2.4 |
| Cl | B | | 0.6 to 2.0 | 0.3 to 1.7 | 0.0 to 1.4 |
| | C | | 0.2 to 1.6 | −0.1 to 1.3 | −0.4 to 1.0 |
| | A | | 0.3 to 1.7 | −0.2 to 1.2 | −0.6 to 0.8 |
| $NO_2$ | B | | −0.7 to 0.7 | −1.2 to 0.2 | −1.6 to −0.2 |
| | C | | −1.1 to 0.3 | −1.6 to −0.2 | −2.0 to −0.6 |

The preparation of the diazo-compounds from the corresponding amines and the reaction of the amines with the dicarboxylic acids may be carried out by methods in themselves known. The condensation to form the diazoamino-compound is advantageously carried out in an alkaline medium. It has been found that the diazoamino-compounds so obtained cannot be isolated satisfactorily from the reaction mixture by the usual methods. It is indeed possible in many cases to bring about precipitation by the addition of large quantities of an alkali hydroxide. It is surprising however, that the products can be worked up very successfully, if desired, after filtering the mixture to remove insoluble impurities, by subjecting the solutions of the diazoamino-compounds to a rapid drying process. This procedure is in many respects more advantageous than precipitation by means of an alkali hydroxide. By a rapid drying process is meant a process in which the material to be dried is exposed to a high temperature in the aqueous condition for only a short time, advantageously a period of the order of a few seconds, but it is permissible, as soon as the material is once dry, to maintain it at a high temperature for a longer period. Accordingly, there are suitable drying or evaporation methods in which the solution to be evaporated to dryness is exposed continuously in a finely divided condition to a powerful source of heat, and advantageously care is taken to ensure a continuous and thoroughly effective removal of the water vapour formed.

Especially advantageous is spray drying. The term "spray drying" is used in its ordinary sense to mean a treatment in which the aqueous solution or suspension to be dried is finely sprayed or atomized, and simultaneously exposed to a current of hot air. The heat of the current of air is used to evaporate the solvent, more especially water. In this manner the whole air-solvent vapor-dry material system undergoes cooling. For producing dry products from aqueous solutions or suspensions it is generally necessary to maintain the outlet temperature of the said system at at least about 70° C., and advantageously between 80 and 100° C., and it is necessary to work with an air inlet temperature above 100° C., and advantageously between about 130 and 180° C., in order to avoid having to use uneconomically large quantities of air.

Instead of spray drying another rapid drying process may be used, for example, a drying process in which the cold solution is applied in a thin layer to a hot roller or moving band. In this case it is of advantage by heating the moving drying surface, for example, the roller, to a sufficiently high temperature, on the one hand, and by finely distributing the material to be dried, for example, by converting it into droplets or by spraying it, on the other, to ensure that a thin uniform film of the material to be dried is formed from which the solvent can be completely distilled in a short time. The dry layer must be completely removed from the hot surface by means of a knife or other suitable device after a short time, and in any event before fresh solution is sprayed onto the place occupied by the dry material.

It is surprising that in these rapid drying processes there is at most only a very slight decomposition of the diazo-compound or diazoamino-compound, and this is so even in cases where, owing to an unfavorable equilibrium being established between the starting materials and the diazoamino-compound in carrying out the condensation, the temperature-sensitive diazo-compound is still present in not inconsiderable quantities.

The new diazoamino-compounds can be worked up in the usual manner with suitable coupling components (so-called naphthols), such, for example, as acetoacetylamino-compounds, 2-hydroxynaphthalene-3-carboxylic acid arylides, hydroxydiphenylene oxide-carboxylic acid arylides, hydroxycarbazole-carboxylic acid arylides or hydroxyanthracene carboxylic acid arylides, to form valuable preparations and printing pastes. From diazoamino-compounds of the Formula 5 there are obtained preparations and printing pastes, for which acid steaming is not necessary for developing the prints and which need no additions serving to produce an acid reaction. It will be understood, however, that development may be carried out by acid steaming, in which case only a very short period of acid steaming is generally necessary for complete development.

The following examples illustrate the invention, the parts and percentages being by weight unless otherwise stated and the relationship of parts by weight to parts by volume being the same as that of the kilogram to the liter:

Example 1

16.8 parts of 1 - amino - 2 - nitro - 4 - methoxybenzene ($pK_A=0.5$), 6.9 parts of sodium nitrite and 100 parts of water are stirred overnight, then the mixture is cooled to 0–5° C. and 100 parts of ice are added. 35 parts of hydrochloric acid of 30 percent strength are then poured in, and the mixture is stirred for ½ hour at 0–5° C. At the same time there is prepared a solution of 2.3 parts of α-(2-carboxyphenyl)-aminobutyric acid in 200 parts of water and a sufficient quantity of a sodium hydroxide solution of 30 percent strength to produce a clear solution having a pH value of 7 to 8. 2 parts of anhydrous sodium carbonate and 2 parts of sodium bicarbonate are added, and the mixture is cooled to —3° C. and then the filtered diazo-solution is run in below the surface, while care is taken by simultaneously introducing dropwise a sodium hydroxide solution of 30 percent strength to maintain the pH value between 9.5 and 10 and producing a pH value of 10 at the end of the coupling. A mixture is filtered with a small amount of diatomaceous earth in order to remove some impurities. The filtrate is treated in a spray dryer while maintained at 0 to +3° C. The inlet temperature of the air is 140–180° C. and the outlet temperature must not be less than 80° C. and not substantially higher than 100° C. The diazoamino-compound is obtained in the form of a red-brown powder which dissolves easily in water and has a content of about 50 percent. The yield amounts to 80–85 percent of the theoretical yield.

By using instead of α-(2-carboxyphenyl)-aminobutyric acid, 20.9 parts of α-(2-carboxyphenyl)-aminopropionic acid and otherwise proceeding in exactly the same manner, the diazoamino-compound is obtained in the same form and in the same yield.

The stabilizers used in this example may be prepared, inter alia, as follows:

137 parts of anthranilic acid, 70 parts of pulverized potassium cyanide, 48 parts of acetaldehyde (or 63.8 parts of propionaldehyde), 400 parts of water and 400 parts of methanol are mixed together, during which the temperature rises to 45–50° C. with the formation of a clear solution. 121.5 parts of hydrochloric acid of 30 percent strength are then introduced dropwise in the course of ½ hour, the mixture is stirred for a further 4 hours at 55–60° C. and the whole is allowed to cool overnight. The precipitate which has formed is filtered off with suction, washed with dilute hydrochloric acid and then with water until the washings are neutral, and then it is well dried by suction. Further quantities of the reaction product can be obtained from the mother liquor by acidification with hydrochloric acid of 30 percent strength.

The filter cake is dispersed in 400 parts by volume of a 10 N-solution of potassium hydroxide, and the whole is stirred at 50–55° C. for 10–15 hours. The clear solution is then cooled, mixed with hydrochloric acid of 30 percent strength until the reaction is distinctly acid to Congo paper, 80 parts of sodium chloride are added, the precipitate formed is then filtered off with suction, and washed neutral with water. There is obtained in good yield a white to yellowish powder having a content of about 90 percent, which dissolves completely in a dilute solution of sodium carbonate.

Example 2

15.2 parts of 1-amino-2-methyl-4-nitrobenzene ($pK_A=0.9$) are diazotized as described in Example 1. At the same time there is prepared, also in the manner described in Example 1, a solution of 20.9 parts of α-(2-carboxyphenyl)-aminopropionic acid, the solution is combined with the filtered diazo-solution in the same manner, and the mixture is worked up in a spray dryer under the same conditions. The diazoamino-compound is obtained in the form of an orange-red powder having a content of 50 percent in a yield of 80–85 percent.

Example 3

16.8 parts of 1-amino-2-methoxy-4-nitrobenzene ($pK_A=1.0$) are diazotized in the manner described in Example 1 for 1-amino-2-nitro-4-methoxybenzene. The filtered solution is united with a solution, prepared in the same manner of 23.7 parts of α-(2-carboxyphenyl)-amino-valeric acid, and the diazoamino-compound is isolated in a spray dryer. It is a reddish brown powder having similar properties, and is obtained in a yield amounting to 80–85 percent of the theoretical yield.

α-(2-carboxyphenyl)-aminovaleric acid can be prepared by the method given in Example 1, by using 79.2 parts of n-butyraldehyde, instead of the aldehyde mentioned in that example.

By using, instead of α-(2-carboxyphenyl)-amino-valeric acid, 27.3 parts of α-(2-carboxyphenyl)-aminobutyric acid, and otherwise proceeding in the same manner, there is obtained the corresponding diazo-amino-compound in the same yield in the form of a pale brown powder having a content of 50–55 percent.

Example 4

16.2 parts of 1-amino-2:5-dichlorobenzene (pK$_A$=1.8) are stirred overnight with 40 parts of hydrochloric acid of 40 percent strength and 50 parts of water, then cooled to 5° C., mixed with 100 parts of ice, and then a solution of 6.9 parts of sodium nitrite in 25 parts of water is added in one portion. The mixture is stirred for a further ½ hour at 0–5° C., and then filtered to remove a small amount of insoluble matter. The solution is united with a solution of 27.1 parts of α-(2-carboxyphenyl)-aminophenyl-acetic acid

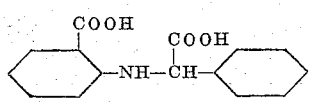

which has been prepared in the manner described in Example 1, the mixture is then filtered with diatomaceous earth, and worked up in a spray dryer in the manner described in Example 1. The diazoamino-compound is obtained in the form of a pale powder in a yield amounting to 75–80 percent of the theoretical yield. α-(2-carboxyphenyl)-aminophenylacetic acid is advantageously prepared in a manner analogous to that described in Example 1 with the use of 117 parts of benzaldehyde.

By using, instead of this stabiliser, 23.7 parts of α-(2-carboxyphenyl)-aminovaleric acid, the corresponding diazoamino-compound is obtained in approximately 80 percent yield under the same working conditions.

Example 5

19.55 parts of 1-amino-2-chloro-5-trifluoromethyl-benzene (pK$_A$=1.6) are stirred with 100 parts of hydrochloric acid of 30 percent strength overnight. The temperature is then lowered to −15 to −20° C. by external cooling and by the addition of 100 parts of ice, and a solution of 6.9 parts of sodium nitrite in 25 parts of water is run in very rapidly below the surface. After a few minutes an almost clear solution is formed, which is filtered to remove a small amount of impurities. At the same time there is prepared a solution of 23.7 parts of α-(2-carboxyphenyl)-amino-β-methyl-butyric acid in the manner described in Example 1, and the solution is cooled to −3° C. and mixed with the diazo solution under the same conditions. By isolating the product in a spray dryer the diazoamino-compound is obtained in the form of a yellow-orange powder having a content of about 45 percent strength and in a yield of 80 percent.

The above stabilizer can be made in satisfactory yield by the method described in Example 1 with the use of 79.2 parts of isobutyraldehyde, instead of the aldehyde mentioned in that example.

The filtered solution of the diazoamino-compound obtained in this example can be worked up on a roller dryer. For this purpose the solution is charged into a pressure vessel, and cooled to −2° C. by external cooling. The apparatus is as follows:

An externally chromium plated and polished hollow steel roller is mounted horizontally and is freely rotatable. It has a connection for admitting superheated steam at a maximum at 6 atmospheres gauge pressure. A brass knife is pressed against the surface of the roller by means of weights at approximately the level of the axis. At a distance of 20–25 centimeters from the roller surface and directed perpendicularly towards the middle of the axis is arranged a nozzle connected to the pressure vessel and so adjusted that owing to the supply of the solution under a pressure of 2–5 atmospheres gauge pressure the solution is finely atomized and sprayed on the roller, without any special air supply. With a roller of 20 centimeters radius and 20–25 centimeters long and at a speed of rotation of about 6 revolutions per minute, the nozzle and knife are so disposed that the two planes which they form with the roller axis are at an angle of 120° C. The residence time of the material being dried on the roller is then 3–4 seconds when the roller rotates from the nozzle to the knife in the direction of the shorter distance between them. The solution is sprayed at the rate of 3–4 liters per hour, and the temperature at the surface of the roller is 115–140° C. (corresponding to 2–5 atmospheres gauge pressure of steam).

The finished diazoamino-compound is removed from the roller in the form of a pale brown powder, and must be further ground in order to obtain a uniformly fine grain size. The diazoamino-compound so obtained does not differ substantially in content or yield from the product obtained by spray drying.

Example 6

17.1 parts of 1-aminobenzene-4-methylsulfone (pK$_A$=1.7) in 50 parts of water are stirred overnight at room temperature with a solution of 6.9 parts of sodium nitrite in 25 parts of water and with 5 parts of a solution of 30 percent strength of the hydrochloride of oleyl-diethyl-ethylene diamine, the mixture is then cooled to 0° C., mixed with 75 parts of ice, and diazotized by pouring in 35 parts of hydrochloric acid of 30 percent strength. The whole is stirred for a further ½ hour at 0° C. and filtered to remove a small amount of insoluble matter. This diazosolution is united at −3° C. with a solution prepared, as described in Example 6 from 23.7 parts of α-(2-carboxyphenyl)-amino-β-methyl-butyric acid, and care is taken by the simultaneous addition of a sodium hydroxide solution of 30 percent strength that the pH value is maintained at 9.5–10 during the coupling and that the pH value is finally 11. The mixture is worked up in a spray dryer in the manner described in the preceding examples. There is obtained a diazoamino-compound in the form of a reddish powder having a content of 45–50 percent and in a yield of about 75 percent of the theoretical yield.

Example 7

16.65 parts of 1-amino-2-chloro-4-cyano-5-methyl-benzene (pK$_A$=0.2) are heated with 30 parts of hydrochloric acid of 30 percent strength, 30 parts of water and 5 parts of a solution of 30 percent strength of the hydrochloride of oleyl-diethyl-ethylene diamine for a short time until dissolution occurs, then the solution is cooled to 0° C. mixed with 75 parts of ice, and diazotized with 6.9 parts of sodium nitrite in 25 parts of water. The mixture is filtered to remove a small amount of impurities, and the diazo-solution is then coupled with a solution, prepared as described in Example 6, of 23.7 parts of α-(2-carboxyphenyl)-amino-β-methyl-butyric acid. By working up the solution in a spray drier the diazoamino-compound is obtained in the form of an orange-red powder having a content of about 45 percent and in a yield of 75–80 percent of the theoretical yield.

Example 8

The diazoamino-compounds described in Examples 1–7 are made up into printing preparations according to the following Table:

For 100 parts of printing preparation:

| | Diazoamino-compound from— | | Content, percent | According to Example | Parts | Coupling component | Sodium di-isopropyl-naphthalene sulfonate | Tint |
|---|---|---|---|---|---|---|---|---|
| | Parts | Diazo-component / Stabilizer | | | | | | |
| A | 73.1 | 1-amino-2-nitro-4-methoxybenzene. / α-(2-Carboxyphenyl)-aminobutyric acid. | 50 | 1 | 25.9 | 2:3-hydroxynaphthoic acid anilide (Na-salt). | 1.0 | Bordeaux. |
| B | 70.6 | 1-amino-2-methoxy-4-nitro-benzene. / α-(2-carboxyphenyl)-aminovaleric acid. | 50 | 3 | 28.4 | 2:3-hydroxynaphthoic acid-1'-naphthyl-amide (Na-salt). | 1.0 | Do. |
| C | 73.1 | 1-amino-2:5-dichlorobenzene. / α-(2-carboxyphenyl)-aminophenylacetic acid. | 50 | 4 | 25.9 | 2:3-hydroxynaphthoic acid-2'-methoxyanilide (Na-salt). | 1.0 | Scarlet. |
| D | 75.0 | 1-amino-2-chloro-5-trifluoromethylbenzene. / α-(2-carboxyphenyl)-amino-β-methylbutyric acid. | 45 | 5 | 24.0 | do | 1.0 | Orange. |
| E | 72.0 | 1-amino-benzene-4-methyl-sulfone. / do | 50 | 6 | 27.0 | do | 1.0 | Do. |
| F | 75.6 | 1-amino-2-chloro-4-cyan-5-methyl-benzene. / do | 45 | 7 | 23.4 | 2:3-hydroxynaphthoic acid anilide (Na-salt). | 1.0 | Scarlet. |

With these preparations printing pastes are prepared as follows:

| | A | B | C | D | E | F |
|---|---|---|---|---|---|---|
| Printing preparation | 50 | 70 | 50 | 50 | 60 | 60 |
| Urea | | | 50 | | | |
| Glycerine | | | | 30 | | |
| Alcohol | 30 | 30 | | | | |
| Thiodiethylene glycol | 30 | 50 | | 30 | | |
| Sodium diisopropylnaphthalene sulfonate, 10% solution | | | | | 30 | 30 |
| Glycol monoethyl ether | | | 50 | | | |
| Water | 255 | 265 | 320 | 305 | 330 | 335 |
| Sodium hydroxide solution of 30% strength | 10 | 10 | 10 | 15 | 10 | 5 |
| Starch-tragacanth thickening | 600 | 550 | 500 | 550 | 550 | 550 |
| Sodium chlorate | | | 10 | 10 | 10 | 10 |
| Neutral chromate solution of 16.2% strength | 15 | 15 | | | | |
| Turpentine oil | 10 | 10 | 10 | 10 | 10 | 10 |
| | 1,000 | 1,000 | 1,000 | 1,000 | 1,000 | 1,000 |

Cotton fabrics are printed with these printing pastes. The printed material is dried at 50–60° C., and then steamed in a Mather-Platt apparatus for 5–8 minutes at 100° C. under neutral conditions. The material is then rinsed in the cold, and treated with an enzyme preparation for 10 minutes at 40–50° C. in order to remove the starch. It is then again rinsed in the cold, soaped at the boil for 10 minutes, and dried after being rinsed again. There are obtained pure full prints. Prints of the same strength are obtained by steaming for 2–5 minutes at 100° C. under acid conditions, instead of under neutral conditions.

What is claimed is:
1. A diazoamino compound of the formula

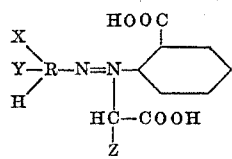

in which R represents a benzene radical, Y is in para-position and X and H are each in ortho-position to the —N=N— group, X represents a member selected from the group consisting of a hydrogen atom, a chlorine atom, a nitro group, a methyl group, a methoxy group and an ethoxy group, the latter three substituents being denoted by the symbol U, Y represents a member selected from the group consisting of a hydrogen atom and a substituent and Z represents a member selected from the group consisting of a methyl group, an ethyl group, an n-propyl group, an isopropyl group and a phenyl radical, the ethyl and n-propyl group being denoted by the symbol V and the isopropyl group and phenyl radical by the symbol W, and in which formula the radical $$Y-R\begin{matrix}X\\\diagup\\\diagdown\\H\end{matrix}-N=N-$$

is the radical of an amine which is free from groups imparting solubility in water and corresponds to the formula $$Y-R\begin{matrix}X\\\diagup\\\diagdown\\H\end{matrix}-NH_2$$

and the $pK_A$-value of which amine differs by at most ±0.7 from the value $$c = c_{X;Z} - c_Y$$

where $c$ is determined in accordance with the substituents present in the diazoamino compound and with the equations $$c_{(X=H;\ Z=CH_3)} = 3.4,\ c_{(X=U;\ Z=CH_3)} = 2.7$$
$$c_{(X=Cl;\ Z=CH_3)} = 2.3,\ c_{(X=NO_2;\ Z=CH_3)} = 1.0$$
$$c_{(X=H;\ Z=V)} = 3.2,\ c_{(X=U;\ Z=V)} = 2.2$$
$$c_{(X=Cl;\ Z=V)} = 2.0,\ c_{(X=NO_2;\ Z=V)} = 0.5$$
$$c_{(X=H;\ Z=W)} = 2.8,\ c_{(X=U;\ Z=W)} = 2.0$$
$$c_{(X=Cl;\ Z=W)} = 1.7,\ c_{(X=NO_2;\ Z=W)} = 0.1$$
$$c_{(Y=CN,\ SO_2Alkyl,\ sulfonamide)} = 1.0\ \text{and}\ c_{(Y=NO_2)} = 1.4$$

and $c_Y = 0$ when Y is different from CN, $SO_2$alkyl sulfonamide and $NO_2$.

2. The diazoamino compound of the formula

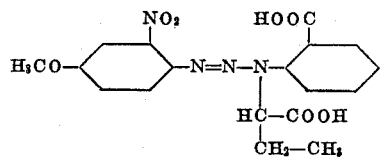

3. The diazoamino compound of the formula

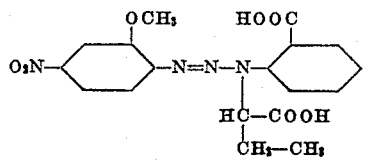

4. The diazoamino compound of the formula
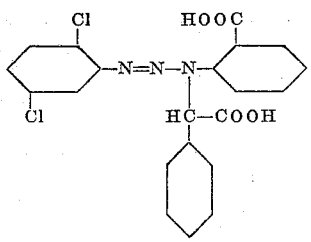
5. The diazoamino compound of the formula
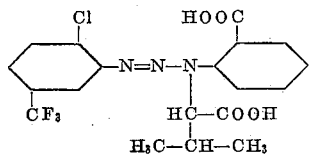
6. The diazoamino compound of the formula
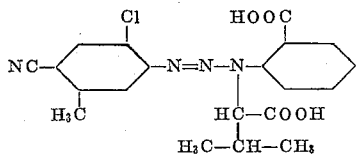
References Cited in the file of this patent
UNITED STATES PATENTS
2,675,374  Petiticolas _____ Apr. 13, 1954
FOREIGN PATENTS
1,049,221  France _____ Aug. 12, 1953